(12) United States Patent
Izuo

(10) Patent No.: US 12,507,998 B2
(45) Date of Patent: Dec. 30, 2025

(54) ULTRASONIC APPARATUS

(71) Applicant: SEIKO EPSON CORPORATION, Tokyo (JP)

(72) Inventor: Seiji Izuo, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 35 days.

(21) Appl. No.: 18/451,220

(22) Filed: Aug. 17, 2023

(65) Prior Publication Data

US 2024/0057977 A1 Feb. 22, 2024

(30) Foreign Application Priority Data

Aug. 18, 2022 (JP) ................. 2022-130723

(51) Int. Cl.
*A61B 8/00* (2006.01)

(52) U.S. Cl.
CPC .......... *A61B 8/5207* (2013.01); *A61B 8/4245* (2013.01); *A61B 8/4488* (2013.01); *A61B 8/461* (2013.01); *A61B 8/5269* (2013.01); *A61B 8/54* (2013.01)

(58) Field of Classification Search
CPC ....... A61B 8/06; A61B 8/4227; A61B 8/4245; A61B 8/44; A61B 8/4427; A61B 8/4472; A61B 8/4483; A61B 8/4488; A61B 8/46; A61B 8/461; A61B 8/5207; A61B 8/5269; A61B 8/54
See application file for complete search history.

(56) References Cited

U.S. PATENT DOCUMENTS

| | | | |
|---|---|---|---|
| 2007/0010742 A1* | 1/2007 | Torp | A61B 5/6843 600/437 |
| 2014/0058264 A1* | 2/2014 | Baym | A61B 8/4477 600/447 |
| 2016/0106381 A1* | 4/2016 | Aase | A61B 17/3403 600/459 |
| 2016/0262721 A1* | 9/2016 | Kano | A61B 8/14 |

FOREIGN PATENT DOCUMENTS

JP 2014-132919 A 7/2014

\* cited by examiner

*Primary Examiner* — Brooke Lyn Klein
(74) *Attorney, Agent, or Firm* — Harness, Dickey & Pierce, P.L.C.

(57) ABSTRACT

An ultrasonic apparatus includes: an ultrasonic transmission and reception unit including a plurality of ultrasonic elements configured to transmit ultrasonic waves, receive the ultrasonic waves reflected inside an object and output a reception signal, the plurality of ultrasonic elements being arranged in an array; a determination unit configured to determine whether a position of the ultrasonic transmission and reception unit with respect to the object is appropriate based on the reception signal output from each of the ultrasonic elements when the plurality of ultrasonic elements receive the ultrasonic waves; and a notification unit configured to notify a user of a position change of the ultrasonic transmission and reception unit when the determination unit determines that the position of the ultrasonic transmission and reception unit with respect to the object is inappropriate.

2 Claims, 15 Drawing Sheets

FIG. 12

| | TRANSMISSION AND RECEPTION COLUMN | RECEPTION SIGNAL | SIGNAL CORRECTION |
|---|---|---|---|
| PATTERN P1 | CH1 | NORMAL | — |
| | CH2 | NORMAL | — |
| | CH3 | NORMAL | — |
| | CH4 | NORMAL | — |
| | TRANSMISSION AND RECEPTION COLUMN | RECEPTION SIGNAL | SIGNAL CORRECTION |
| PATTERN P2 | CH1 | NORMAL | — |
| | CH2 | ABNORMAL | AVERAGE OF CH1, 3 |
| | CH3 | NORMAL | — |
| | CH4 | NORMAL | — |
| | TRANSMISSION AND RECEPTION COLUMN | RECEPTION SIGNAL | SIGNAL CORRECTION |
| PATTERN P3 | CH1 | ABNORMAL | AVERAGE OF CH2, 3, 4 |
| | CH2 | NORMAL | — |
| | CH3 | NORMAL | — |
| | CH4 | NORMAL | — |
| | TRANSMISSION AND RECEPTION COLUMN | RECEPTION SIGNAL | SIGNAL CORRECTION |
| PATTERN P4 | CH1 | NORMAL | ERROR |
| | CH2 | ABNORMAL | |
| | CH3 | ABNORMAL | |
| | CH4 | NORMAL | |

ULTRASONIC APPARATUS

The present application is based on, and claims priority from JP Application Serial Number 2022-130723, filed Aug. 18, 2022, the disclosure of which is hereby incorporated by reference herein in its entirety.

BACKGROUND

1. Technical Field

The present disclosure relates to an ultrasonic apparatus.

2. Related Art

In the related art, an ultrasonic probe that can be attached to an object such as a living body is known (for example, JP-A-2014-132919). The ultrasonic probe described in JP-A-2014-132919 has flexibility, and can be closely attached to the object having an irregular curved surface such as the living body. The ultrasonic probe emits ultrasonic waves to an inside of the object and detects the ultrasonic waves reflected from the inside.

However, the ultrasonic probe described in JP-A-2014-132919 has a problem in that it is difficult to determine whether the attachment position of the ultrasonic probe is appropriate. That is, in the ultrasonic probe of the related art, it is necessary for a user to form an internal tomographic image of the object based on, for example, a measurement result obtained by an ultrasonic measurement, confirm the image, and determine whether an image desired to be measured by the user is obtained.

SUMMARY

An ultrasonic apparatus according to a first aspect of the present disclosure includes: an ultrasonic transmission and reception unit including a plurality of ultrasonic elements configured to transmit ultrasonic waves, receive the ultrasonic waves reflected inside an object and output a reception signal, the plurality of ultrasonic elements being arranged in an array; a determination unit configured to determine whether a position of the ultrasonic transmission and reception unit with respect to the object is appropriate based on the reception signal output from each of the ultrasonic elements when the plurality of ultrasonic elements receive the ultrasonic waves; and a notification unit configured to notify a user of a position change of the ultrasonic transmission and reception unit when the determination unit determines that the position of the ultrasonic transmission and reception unit with respect to the object is inappropriate.

In the ultrasonic apparatus according to the aspect, the determination unit may determine whether the reception signal output from each of the ultrasonic elements is normal, and determine whether the position of the ultrasonic element corresponding to the reception signal with respect to the object is appropriate.

In the ultrasonic apparatus according to the aspect, the determination unit may determine that the reception signal is normal when an attenuation time is equal to or less than a predetermined first time, the attenuation time being time after a peak of a signal value of the reception signal is detected until the signal value is equal to or less than a predetermined first threshold.

In the ultrasonic apparatus according to the aspect, the notification unit may give a notification of a direction in which the ultrasonic transmission and reception unit is to be moved based on a determination result of the ultrasonic elements obtained by the determination unit.

In the ultrasonic apparatus according to the aspect, the determination unit may further determine whether the number of the reception signal determined to be normal is equal to or greater than a predetermined allowable number, and the notification unit may give a notification of the position change of the ultrasonic transmission and reception unit with respect to the object when the number of the reception signal determined to be normal by the determination unit is less than the allowable number.

The ultrasonic apparatus according to the aspect may further include a correction unit configured to correct the reception signal determined to be abnormal based on the reception signal determined to be normal when the number of the reception signal determined to be normal by the determination unit is equal to or greater than the allowable number.

BRIEF DESCRIPTION OF THE DRAWINGS

FIG. 12 is a diagram showing an example of corrections of signal values performed by a correction unit in the second embodiment.

DESCRIPTION OF EMBODIMENTS

First Embodiment

Hereinafter, a first embodiment of the present disclosure will be described.

Figure 1:
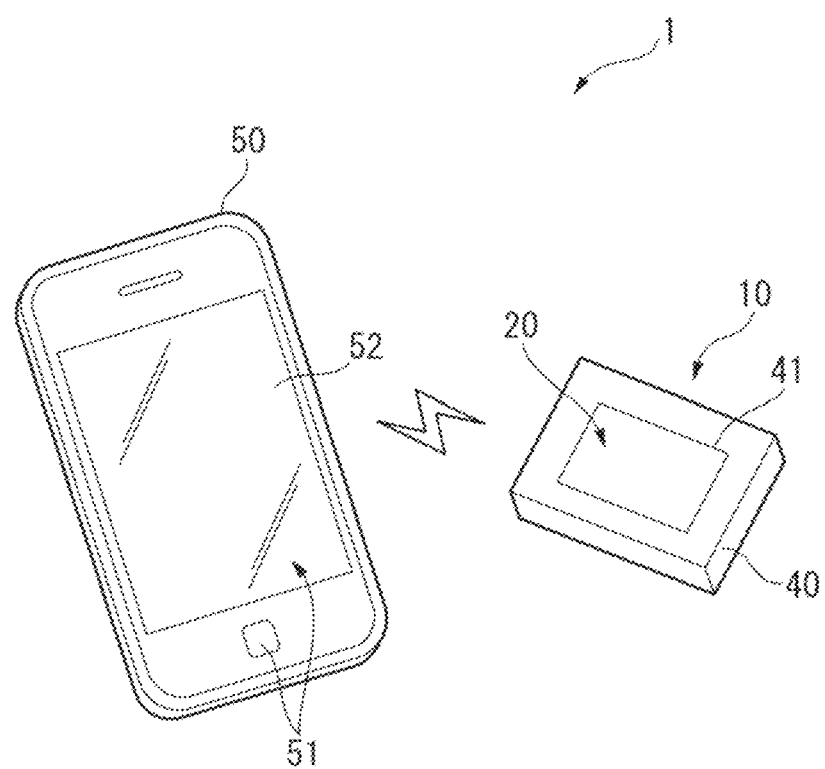
FIG. 1 is a diagram showing a schematic configuration of an ultrasonic system according to a first embodiment.

FIG. 1 is a diagram showing a schematic configuration of an ultrasonic system according to the first embodiment.

As shown in FIG. 1, an ultrasonic system 1 includes an ultrasonic probe 10, which is an ultrasonic apparatus of the present disclosure, and a terminal device 50 communicably connected to the ultrasonic probe 10.

The ultrasonic system 1 transmits ultrasonic waves from the ultrasonic probe 10 into a living body in a state where the ultrasonic probe 10 is in contact with a surface of an object (for example, the living body in the embodiment). In addition, the ultrasonic probe 10 receives ultrasonic waves reflected by an organ (for example, muscle) in the living body, obtains an internal tomographic image or the like of an interior of the living body based on reception signals of the reflected ultrasonic waves, measures a state and a dimension of the organ in the living body, and performs treatment by converging the ultrasonic waves on a predetermined organ.

Configuration of Terminal Device 50

As shown in FIG. 1, the terminal device 50 includes an operation unit 51, which includes a button, a touch panel, and the like, and a display unit 52. Although not shown, the terminal device 50 includes a storage unit implemented by a memory and the like, and a calculation unit implemented by a central processing unit (CPU) and the like. The terminal device 50 controls the ultrasonic system 1 by executing various programs stored in the storage unit by the calculation unit. For example, the terminal device 50 outputs a command for controlling driving of the ultrasonic probe 10, forms an image of an internal structure of the living body based on an ultrasonic signal received from the ultrasonic probe 10, displays the image on the display unit 52, measures biological information such as a blood flow, and display the biological information on the display unit 52. As the terminal device 50, a terminal device such as a tablet terminal, a smartphone, or a personal computer can be used, and a dedicated terminal device for operating the ultrasonic probe 10 may be used.

Configuration of Ultrasonic Probe 10

Figure 2:
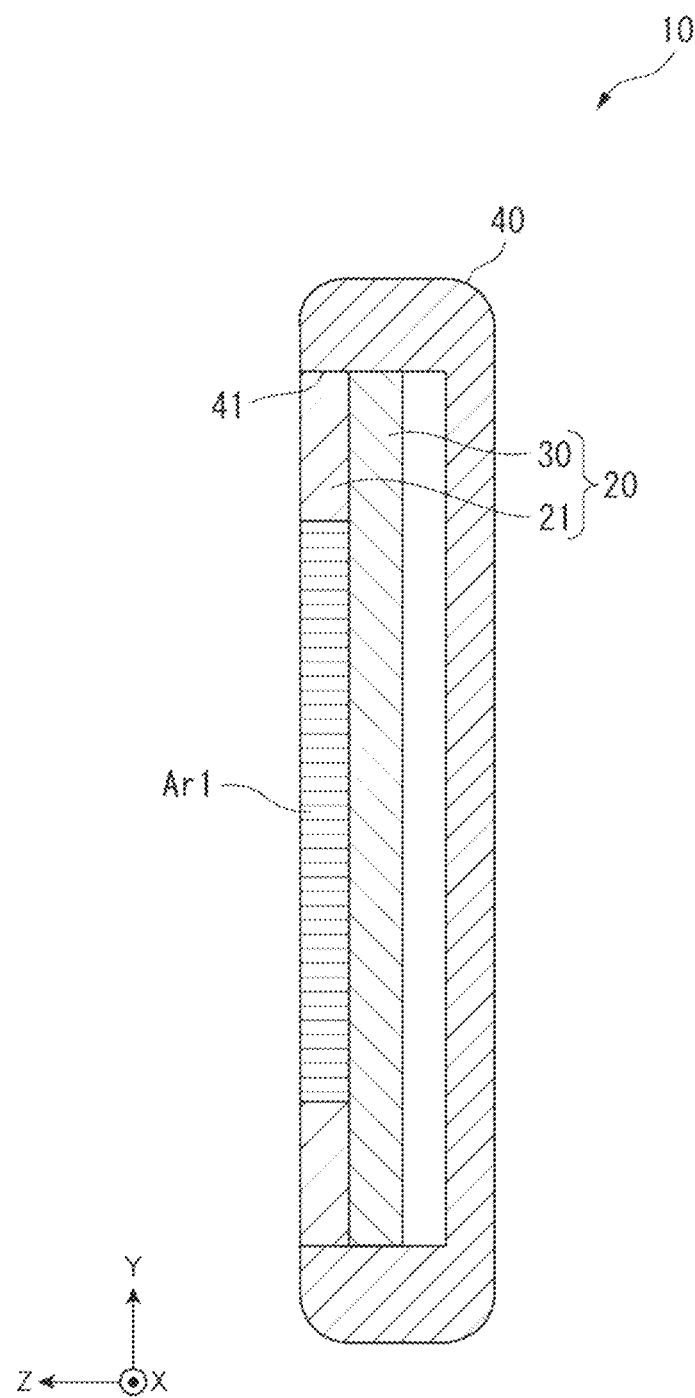
FIG. 2 is a schematic cross-sectional view of an ultrasonic probe according to the first embodiment.

FIG. 2 is a schematic cross-sectional view of the ultrasonic probe 10.

The ultrasonic probe 10 is attached to a living body as the object using, for example, a belt or a medical tape. Then, as described above, the ultrasonic probe 10 transmits ultrasonic waves into the living body and receives the ultrasonic waves reflected by an organ in the living body.

In the embodiment, the ultrasonic probe 10 is communicably connected to the terminal device 50 through, for example, wireless communication, and performs a process of transmitting ultrasonic waves to a living body and a process of receiving ultrasonic waves reflected in the living body based on the command from the terminal device 50.

As shown in FIG. 2, the ultrasonic probe 10 according to the embodiment includes an ultrasonic device 20 and a housing 40 that accommodates the ultrasonic device 20.

Configuration of Ultrasonic Device 20

The ultrasonic device 20 includes an ultrasonic substrate 21 on which a plurality of ultrasonic transducers Tr (see FIGS. 3 and 4) for transmitting and receiving ultrasonic waves are arranged in an array, a control substrate 30 for controlling the ultrasonic transducers Tr, and the like.

Figure 3:
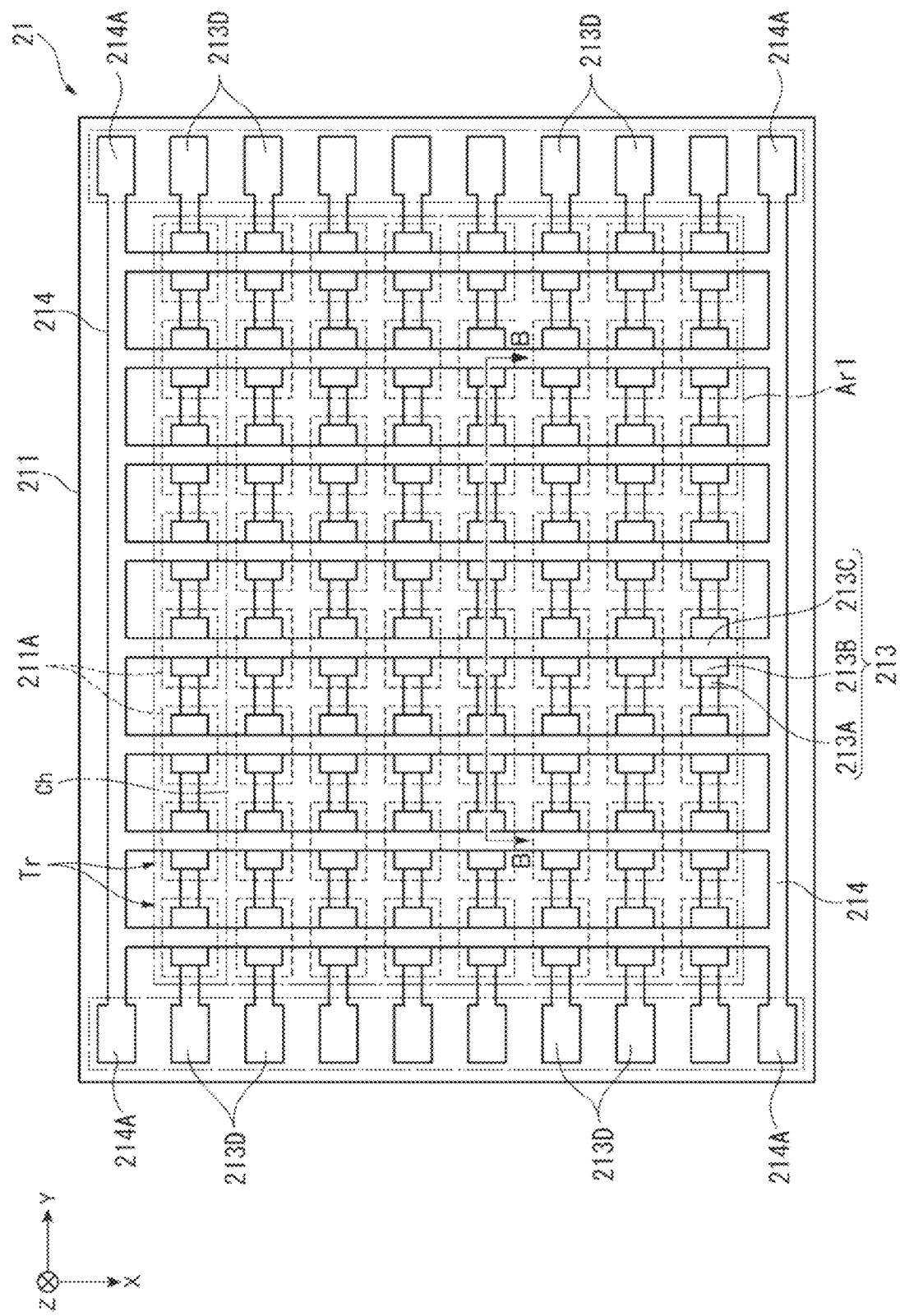
FIG. 3 is a plan view showing an example of an ultrasonic substrate in the first embodiment.
Figure 4:
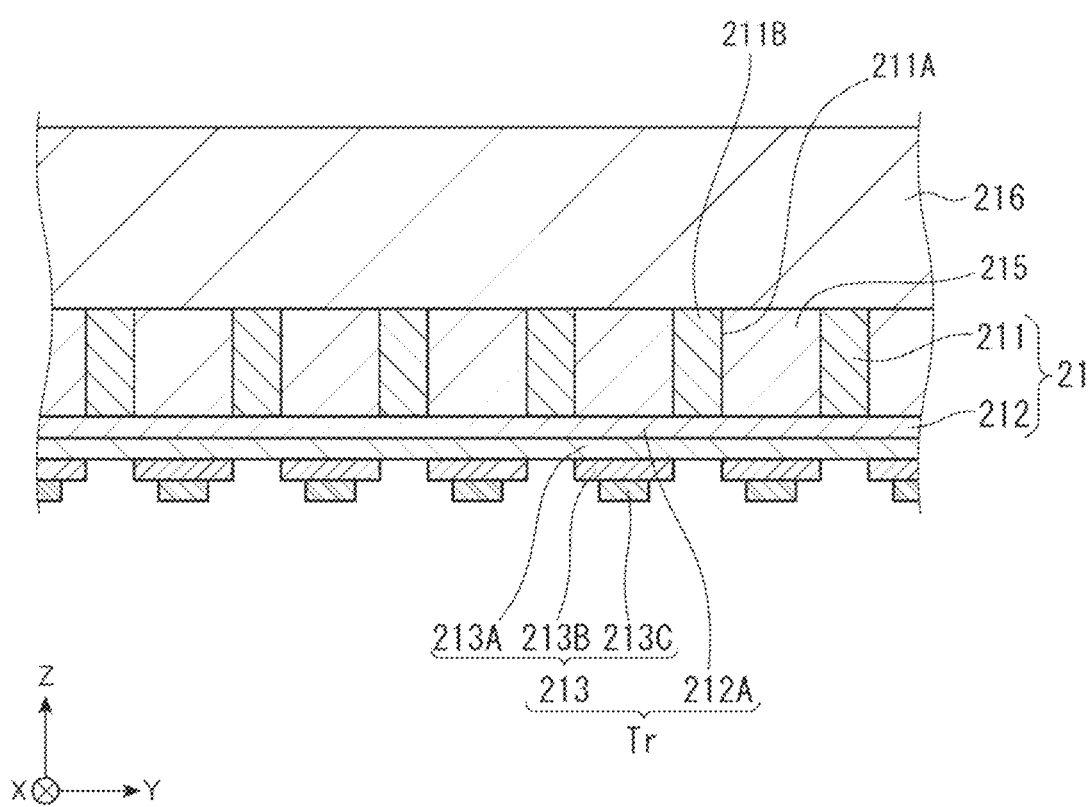
FIG. 4 is a schematic cross-sectional view of the ultrasonic substrate taken along a line B-B in FIG. 3.

FIG. 3 is a plan view showing an example of the ultrasonic substrate 21 in the embodiment, and FIG. 4 is a schematic cross-sectional view of the ultrasonic substrate 21 taken along a line B-B in FIG. 3.

The plurality of ultrasonic transducers Tr are arranged in a two-dimensional array on the ultrasonic substrate 21 along an X direction and a Y direction. Here, a direction orthogonal to the X direction and the Y direction is a Z direction, the Z direction (+Z) corresponds to a transmission direction of the present disclosure in which the ultrasonic waves are transmitted.

In the embodiment, a transmission and reception column Ch of 1 channel (CH) is constituted by the plurality of ultrasonic transducers Tr arranged in the Y direction. In addition, an ultrasonic array Ar1 having a one-dimensional array structure is constituted by arranging the plurality of the transmission and reception columns Ch of 1 CH along the Y direction. In the embodiment, each transmission and reception column Ch constitutes an ultrasonic element of the present disclosure.

In FIG. 3, the arrangement number of the ultrasonic transducers Tr is reduced for convenience of description, and more ultrasonic transducers Tr may be actually provided.

As shown in FIG. 4, the ultrasonic substrate 21 includes an element substrate 211, a vibration plate 212 provided on the element substrate 211, and piezoelectric elements 213 provided on the vibration plate 212.

The element substrate 211 is implemented by a semiconductor substrate made of, for example, Si. The element substrate 211 has substrate opening portions 211A corresponding to the ultrasonic transducers Tr. In the embodiment, each substrate opening portion 211A is a through hole penetrating the element substrate 211 in a substrate thickness direction (Z direction), and the vibration plate 212 is provided on a −Z side (control substrate 30 side) of the through hole.

The substrate opening portion 211A is filled with, on a side (+Z) where the vibration plate 212 is not provided, an acoustic layer 215 having an acoustic impedance close to that of the living body. As the acoustic layer 215, a resin material such as silicone can be used.

On the +Z side of the element substrate 211, a protective layer 216 made of a resin material such as silicone may be provided, or an acoustic lens may be provided.

The vibration plate 212 is implemented by, for example, a stacked body of $SiO_2$ and $ZrO_2$, and covers the entire element substrate 211 on a control substrate 30 side. That is, the vibration plate 212 is supported by partition walls 211B constituting the substrate opening portions 211A and closes the substrate opening portions 211A on the −Z side. A thickness dimension of the vibration plate 212 is sufficiently smaller than that of the element substrate 211.

The piezoelectric elements 213 are provided on the vibration plate 212 that closes the substrate opening portions 211A. The piezoelectric element 213 is implemented by, for example, a stacked body in which a lower electrode 213A, a piezoelectric film 213B, and an upper electrode 213C are stacked from the vibration plate 212 toward the −Z side.

Here, a portion of the vibration plate 212 that closes the substrate opening portion 211A constitutes a vibration portion 212A, and the vibration portion 212A and the piezoelectric element 213 constitute one ultrasonic transducer Tr.

In the ultrasonic transducer Tr, when a rectangular wave voltage (drive signal) having a predetermined frequency is applied between the lower electrode 213A and the upper electrode 213C, the piezoelectric film 213B is bent, the vibration portion 212A vibrates, and ultrasonic waves are transmitted to the +Z side. When the vibration portion 212A is vibrated by the ultrasonic waves (reflected waves) reflected from the living body, a potential difference is generated between upper and lower sides of the piezoelectric film 213B. Accordingly, the received ultrasonic waves can be detected by detecting a potential difference generated between the lower electrode 213A and the upper electrode 213C.

In the embodiment, as shown in FIG. 3, the lower electrode 213A is formed in a linear shape along the X direction, and couples the plurality of ultrasonic transducers Tr constituting the transmission and reception column Ch of 1 CH. A drive terminal 213D is electrically coupled to the control substrate 30 via, for example, a flexible printed substrate.

The upper electrode 213C is formed in a linear shape along the X direction, and couples the ultrasonic transducers Tr arranged in the X direction. End portions of the upper electrode 213C on the ±X sides are coupled to a common electrode line 214. The common electrode line 214 couples a plurality of the upper electrodes 213C arranged along the X direction, and a common terminal 214A electrically coupled to a wiring circuit of the control substrate 30 is provided at an end portion of the common electrode line 214. The common terminal 214A is electrically coupled to the control substrate 30 by, for example, the flexible printed substrate.

In the embodiment, the example in which the ultrasonic array Ar1 having the one-dimensional array structure is formed on the ultrasonic substrate 21 is described, and an ultrasonic array having a two-dimensional array structure may be formed by individually driving the ultrasonic transducers Tr arranged in the X direction and the ultrasonic transducers Tr arranged in the Y direction.

The ultrasonic substrate 21 as described above may be further provided with a reinforcing plate in order to improve substrate strength. When the reinforcing plate is provided, the reinforcing plate is provided on a surface of the vibration plate 212 opposite from the element substrate 211. At this time, a spacer (bonding layer) may be provided in a region other than the vibration portion 212A to bond the reinforcing plate via the spacer, thereby securing a vibration space of the vibration portion 212A.

The control substrate 30 constitutes the ultrasonic device 20 together with the ultrasonic substrate 21. The ultrasonic substrate 21 faces an opening window 41 of the housing 40 to be described later, and the control substrate 30 is disposed on the −Z side of the ultrasonic substrate 21.

The control substrate 30 is coupled to the drive terminal 213D and the common terminal 214A by the flexible printed substrate or the like as described above. Although not shown, the control substrate 30 is provided with, for example, an IC chip, a wireless communication module, and a storage battery.

A control unit 31 (see FIG. 5) for controlling the ultrasonic device 20 is constituted by one or more IC chips, and the driving of the ultrasonic transducer Tr is controlled. The wireless communication module enables the ultrasonic probe 10 and the terminal device to communicate with each other through wireless communication.

Various functional configurations implemented by a control circuit of the control substrate 30 will be described later.

Configuration of Housing 40

Referring back to FIG. 2, the housing 40 is formed in a box shape that accommodates the ultrasonic device 20 therein, and the opening window 41 is provided on one surface on the +Z side. In the embodiment, in the ultrasonic device 20, the element substrate 211, the vibration plate 212, and the piezoelectric element 213 constitute the ultrasonic transducer Tr having a small thickness. Therefore, it is possible to reduce a thickness of the housing 40 in the Z direction to, for example, 10 mm or less.

In the embodiment, a shape of the housing 40 viewed from the Z direction is a substantially rectangular shape. The substantially rectangular housing 40 having a short axis and a long axis is shown as an example, and the housing 40 may have, for example, an elliptical shape or a polygonal shape, or may have a square shape. Here, a length of the housing 40 in a long axis direction (a long side in a rectangular shape) may be 50 mm or less and a length of the housing 40 in a short axis direction may be 25 mm or more in a plan view from the Z direction of the housing 40.

Fixing of Ultrasonic Probe 10

The fixing of the ultrasonic probe 10 to a living body will be described.

In the ultrasonic probe 10 according to the embodiment, after an acoustic matching agent such as water or gel is interposed between the ultrasonic probe 10 and the living body, the ultrasonic probe 10 is in close contact with the living body, and the ultrasonic probe 10 is attached to the living body using a medical tape, a band, or the like.

Here, when the ultrasonic probe 10 is fixed to a living body, it is necessary to attach the ultrasonic probe 10 to a desired measurement position on the living body. For example, when an abdomen is measured using the ultrasonic probe 10, it is necessary to attach the ultrasonic probe 10 to the abdomen using, for example, a medical tape or a band. However, depending on an attachment method, the ultrasonic probe 10 may be attached to an uneven portion such as a navel. When the ultrasonic probe 10 is attached to the uneven portion, an appropriate ultrasonic measurement cannot be performed.

In contrast, the ultrasonic probe 10 in the ultrasonic system 1 according to the embodiment automatically determines whether an attachment position is appropriate, and when the attachment position is inappropriate, notifies a user to change the attachment position of the ultrasonic probe 10.

Configuration of Control Unit 31

Figure 5:
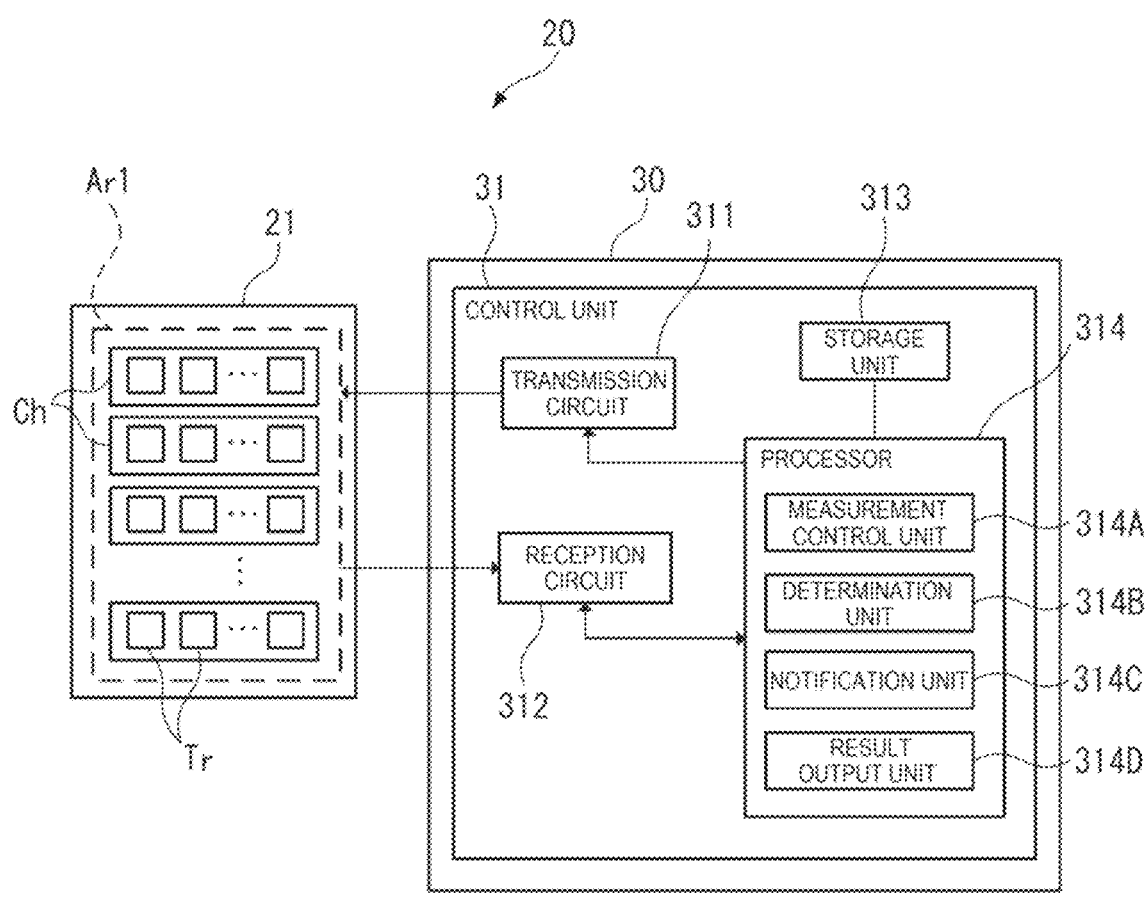
FIG. 5 is a block diagram of an ultrasonic device according to the first embodiment.

FIG. 5 is a block diagram of the ultrasonic device 20 according to the embodiment.

In the embodiment, the control unit 31 is constituted by the IC chip or the like provided in the control substrate 30. The control unit 31 individually controls the transmission and reception columns Ch constituted by the plurality of ultrasonic transducers Tr.

As shown in FIG. 5, the control unit 31 includes a transmission circuit 311, a reception circuit 312, a storage unit 313, and a processor 314. Although not shown, the control unit 31 includes a communication module that communicates with the terminal device 50, a storage battery that supplies power, and the like.

The transmission circuit 311 is coupled to each transmission and reception column Ch and drives the transmission and reception columns Ch individually. That is, the transmission circuit 311 outputs drive signals to the plurality of ultrasonic transducers Tr included in each transmission and reception column Ch, and causes the ultrasonic transducers Tr to transmit ultrasonic waves into the living body.

The reception circuit 312 is coupled to each of the transmission and reception columns Ch, and receives a reception signal output when the ultrasonic waves reflected by the living body are received by each of the ultrasonic transducers Tr. Various circuits that perform signal processing such as amplification of the reception signal, noise removal, and conversion into a digital signal are provided in the reception circuit 312. The reception circuit 312 individually processes the reception signals output from the transmission and reception columns Ch, and outputs the reception signals to the processor 314.

The storage unit 313 stores arrangement positions of the transmission and reception columns which are the ultrasonic element. In the storage unit 313, a positional relationship of the ultrasonic device 20 with respect to the living body based on the reception signals output from the transmission and reception columns is recorded.

The storage unit 313 further records various programs and various types of data for controlling the ultrasonic probe 10.

The processor 314 functions as a measurement control unit 314A, a determination unit 314B, a notification unit 314C, and a result output unit 314D by reading and executing the program recorded in the storage unit 313.

The measurement control unit 314A controls the transmission circuit 311 to drive the transmission and reception columns Ch of the ultrasonic device 20 and transmit ultrasonic waves. Further, the measurement control unit 314A controls the reception circuit 312 to receive the reception signals output when the ultrasonic waves reflected by the living body are received by the transmission and reception columns Ch.

The determination unit 314B determines whether the attachment position of the ultrasonic probe 10, that is, a position of the ultrasonic device 20, which is an ultrasonic transmission and reception unit, with respect to the living body is appropriate based on the reception signals obtained by an ultrasonic transmission and reception process performed by the measurement control unit 314A. The determination unit 314B further determines in which direction the ultrasonic device 20 (ultrasonic probe 10) is to be moved with respect to the living body.

When the determination unit 314B determines that the position of the ultrasonic device 20 is inappropriate, the notification unit 314C notifies the user of prompting to correct the position of the ultrasonic device 20. For example, the ultrasonic probe 10 may be provided with a sound output unit (not shown). In this case, the notification unit 314C may give a notification of information prompting movement of the ultrasonic probe 10 or a movement direction thereof from the sound notification unit. Alternatively, the notification unit 314C may output, to the terminal device 50, command information for outputting the movement direction of the ultrasonic probe 10 and a notification of prompting the movement of the ultrasonic probe 10. In this case, the terminal device 50 may output the movement and the movement direction of the ultrasonic probe 10 by sound from a speaker provided in the terminal device 50, or may display the movement and the movement direction of the ultrasonic probe 10 on the display unit 52.

When the determination unit 314B determines that the position of the ultrasonic device 20 is appropriate, the result output unit 314D outputs a measurement result of an ultrasonic measurement performed by the ultrasonic device 20 to the terminal device 50 under the control of the measurement control unit 314A.

Ultrasonic Measurement Method

Next, operations of the ultrasonic system 1 as described above will be described.

Figure 6:
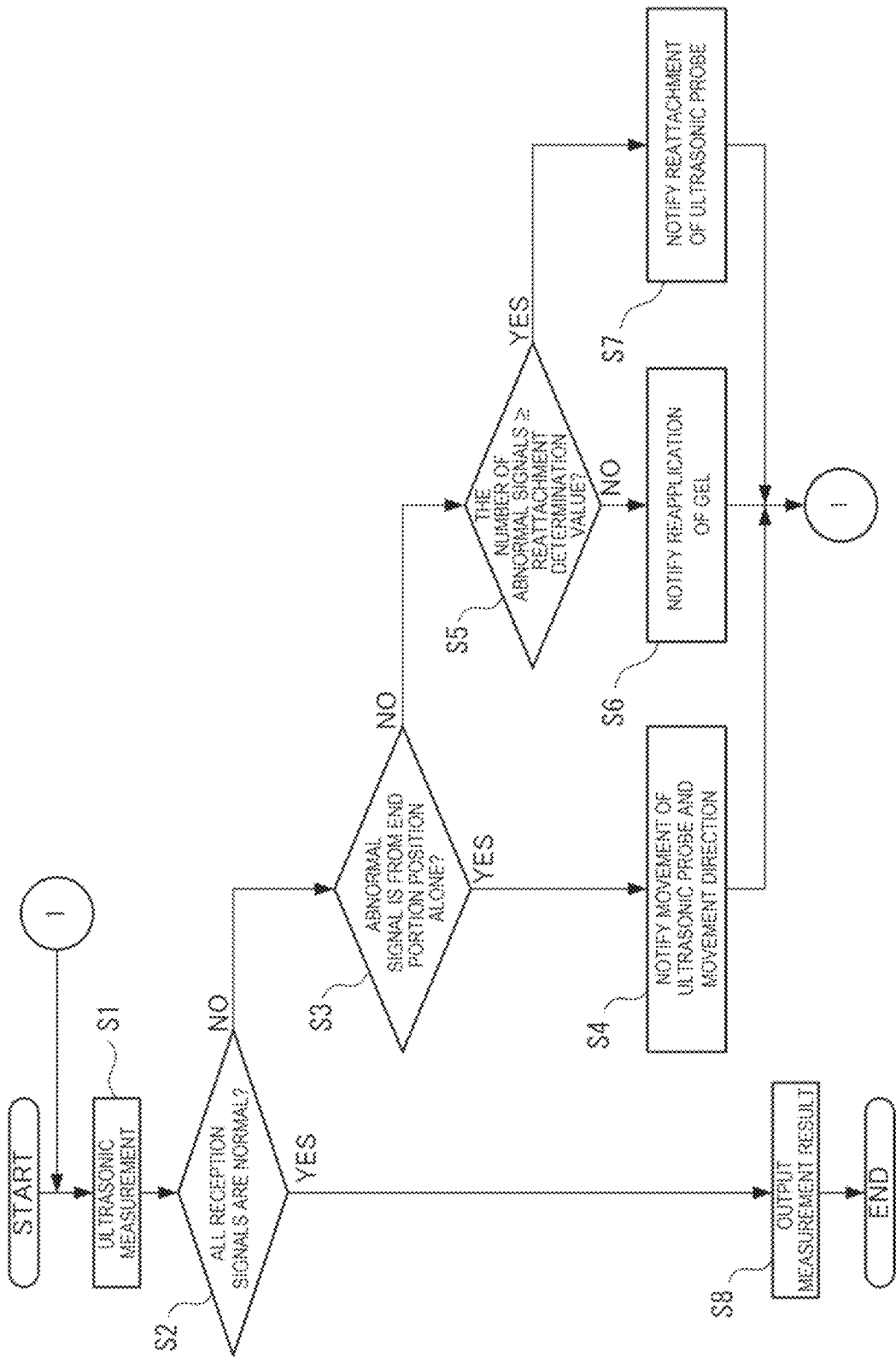
FIG. 6 is a flowchart showing an ultrasonic measurement method in the first embodiment.

FIG. 6 is a flowchart showing an ultrasonic measurement method in the embodiment.

In the ultrasonic system 1 according to the embodiment, first, the user attaches the ultrasonic probe 10 to a living body and inputs an instruction to start the ultrasonic measurement. For example, power supply of the ultrasonic probe 10 is turned on, and settings for implementing the ultrasonic measurement using the ultrasonic probe 10 are input to the terminal device 50.

Accordingly, the measurement control unit 314A controls the transmission circuit 311 and the reception circuit 312 to perform the ultrasonic measurement (step S1). That is, the measurement control unit 314A causes the transmission and reception columns Ch of the ultrasonic device 20 to transmit ultrasonic waves, and causes the transmission and reception columns Ch to receive the ultrasonic waves reflected by a surface of the living body or in the living body.

Next, the determination unit 314B determines whether the position of the ultrasonic device 20 is appropriate based on the reception signals of the transmission and reception columns Ch as an ultrasonic measurement result obtained in step S1.

Figure 7:
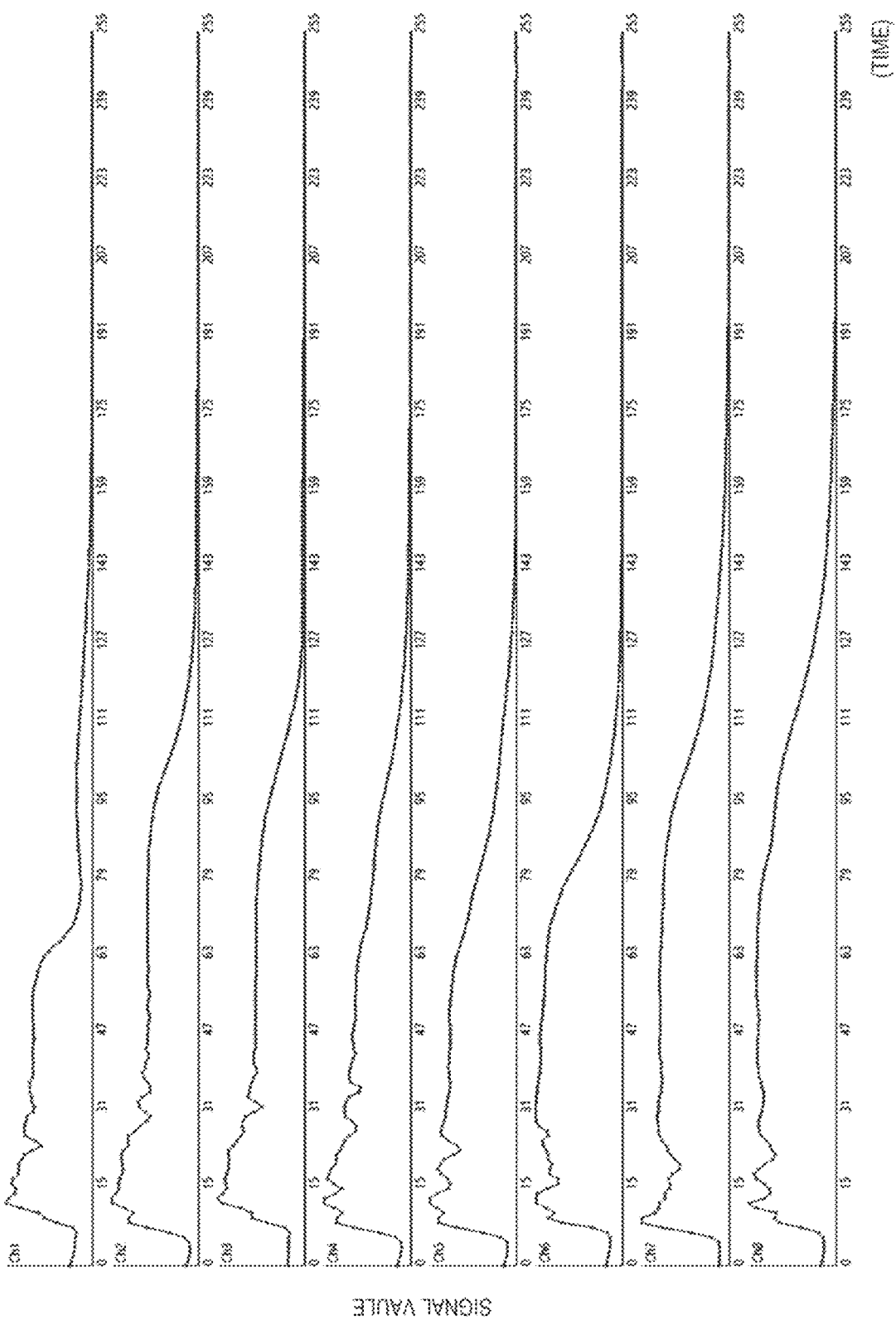
FIG. 7 is a diagram showing an example of reception signals from respective transmission and reception columns as a measurement result of an ultrasonic measurement.
Figure 8:
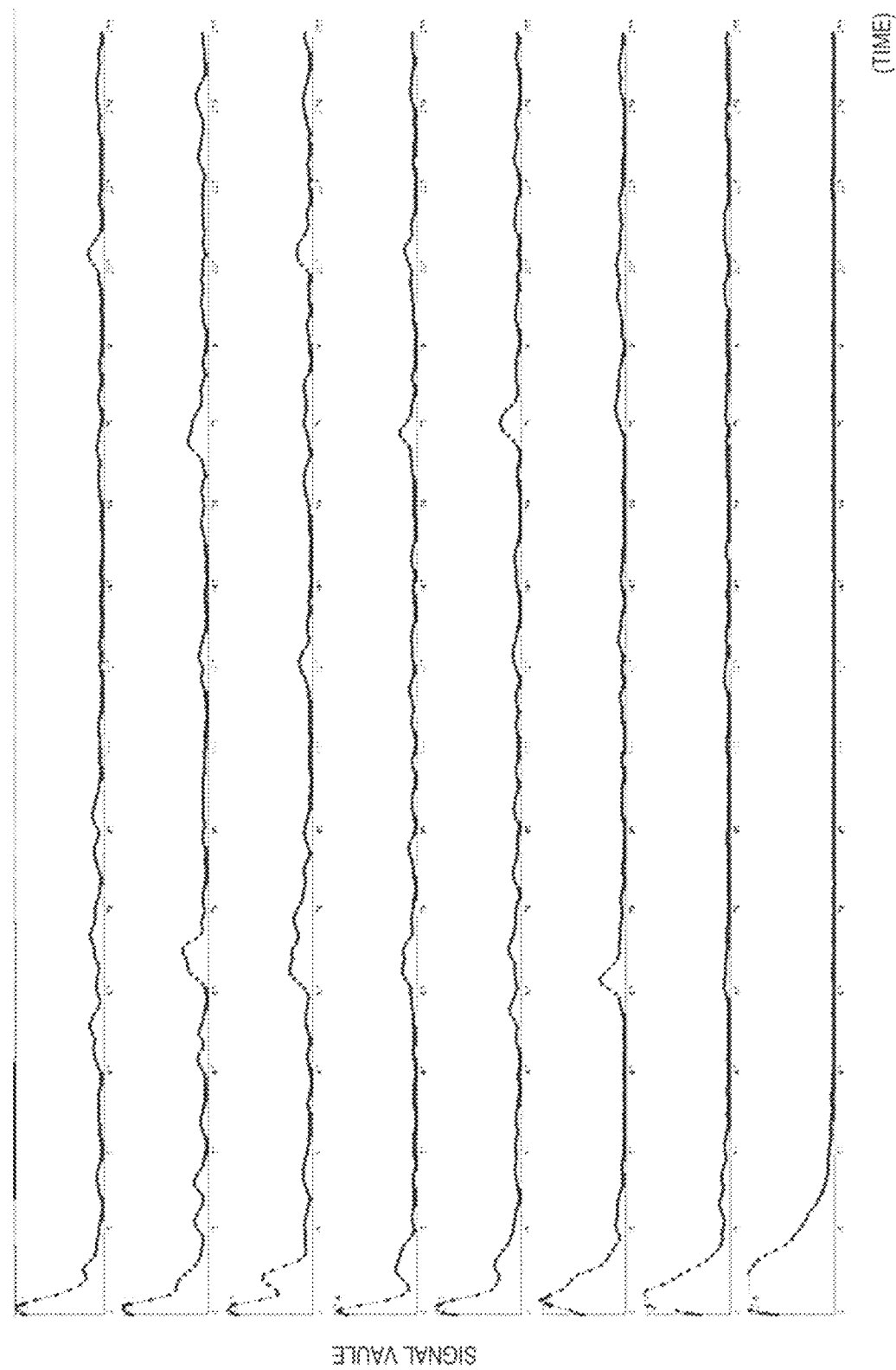
FIG. 8 is a diagram showing an example of the reception signals from the respective transmission and reception columns as the measurement result of the ultrasonic measurement.
Figure 9:
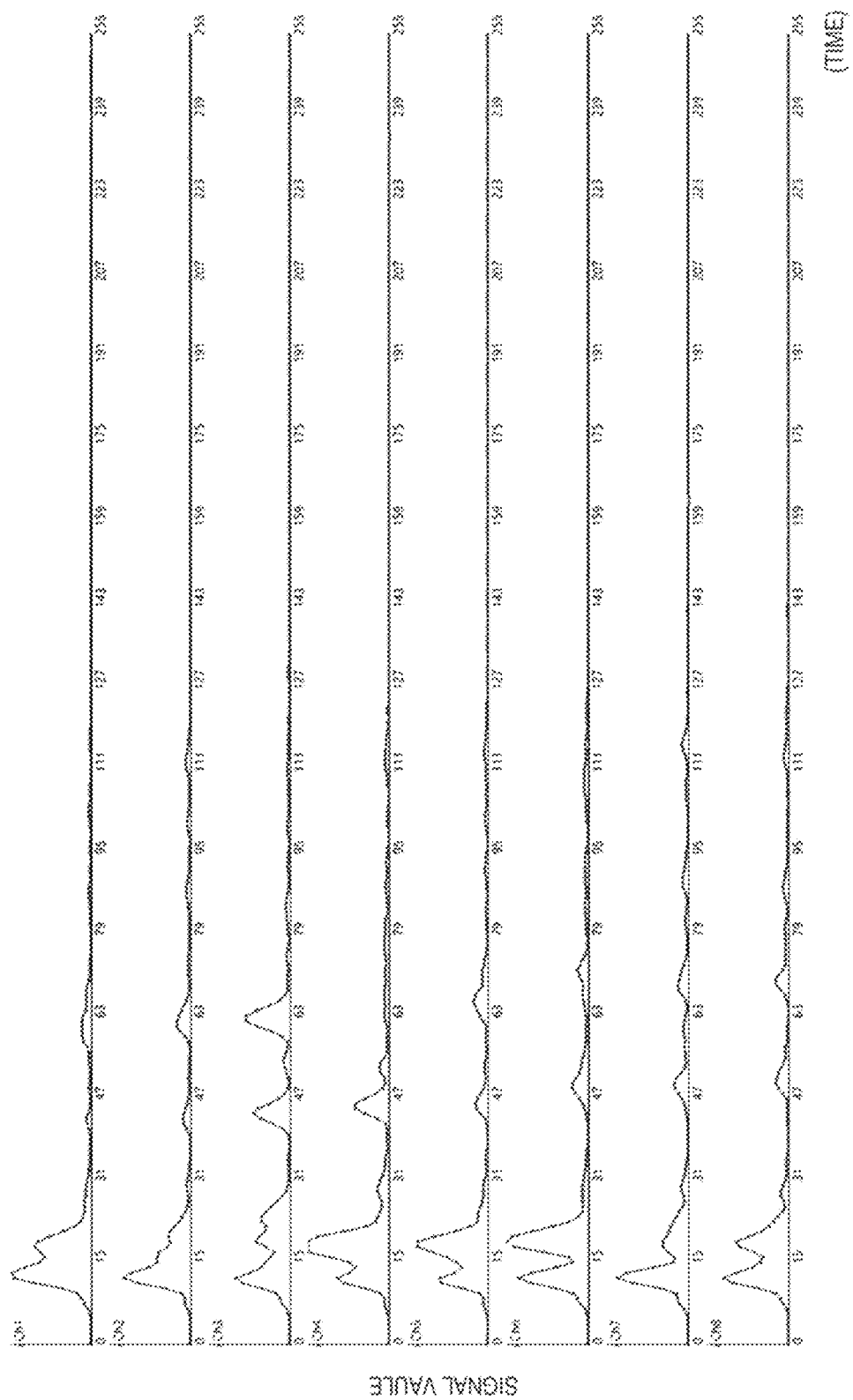
FIG. 9 is a diagram showing an example of the reception signals from the respective transmission and reception columns as the measurement result of the ultrasonic measurement.

FIGS. 7 to 9 are diagrams showing an example of the reception signals from the respective transmission and reception columns Ch as the measurement result of the ultrasonic measurement. The examples shown in FIGS. 7 to 9 are examples in which the ultrasonic device 20 has eight transmission and reception columns Ch, and show signal waveform examples of the reception signals output from the transmission and reception columns Ch.

In the embodiment, the determination unit 314B detects a signal peak (maximum value) of the reception signal, and determines whether the signal peak is within a predetermined allowable range, and whether an attenuation time from a timing at which the signal peak is detected until a signal value of the reception signal is equal to or less than a predetermined first threshold is equal to or less than a predetermined first time.

Here, the allowable range may be, for example, a range that is less than an upper limit value (saturation value) that can be output by the ultrasonic device 20 and the reception circuit 312 and is equal to or greater than a predetermined lower limit value at which at least noise can be excluded.

The first threshold value may be, for example, a half value of the signal peak or a predetermined value set in advance. Further, the first time may be any time that allows determination that the reception signal is a signal that does not contain a tailing component due to reception of ultrasonic waves reflected a plurality of times, and for example, 5 to 10 msec can be exemplified as the first time.

For example, in the example shown in FIG. 7, time from the signal peak of the reception signal until the reception signal reaches the first threshold (half value) is long. This indicates that a signal of the vibration portion 212A is not attenuated since multi-reflected ultrasonic waves are received. Such a reception signal is often observed when the multiple reflection occurs due to an air layer interposed between the ultrasonic probe 10 and the living body, or when the ultrasonic device 20 overlaps the uneven portion (navel or the like) of the living body and the ultrasonic waves subjected to the multiple reflection are continuously received. When such a reception signal is obtained, the determination unit 314B determines that the reception signal is abnormal.

In addition, in the example shown in FIG. 8, the signal peaks of the reception signals output from the transmission and reception columns Ch of Ch 1 to 3, Ch 5, and Ch 7 and 8 are the saturation values. FIG. 8 shows an example in which end portion positions (Ch 1 to 3 and Ch 7 and 8) of the ultrasonic array Ar1 overlap the uneven portion, and the signal peaks of the reception signals are likely to be saturated due to the multiple reflection occurring at the uneven portion. Also in this case, it is determined that a portion facing the transmission and reception columns Ch is inappropriate for the ultrasonic measurement (the reception signal is abnormal).

On the other hand, in the example shown in FIG. 9, the reception signals has no saturation value, and the attenuation time from the signal peak until less than the first threshold (for example, half value) is also equal to or less than the first time (for example, 10 msec). Therefore, the determination unit 314B determines that the transmission and reception columns Ch for all the reception signals are arranged at positions suitable for the ultrasonic measurement.

In the determination of the ultrasonic device 20 performed by the determination unit 314B, first, the determination unit 314B determines whether all the reception signals output from the transmission and reception columns Ch are normal (step S2).

When it is determined as No in step S2, it is determined whether a position of the transmission and reception column Ch that outputs the abnormal reception signal is only one of both end portions among the plurality of transmission and reception columns Ch arranged in the Y direction (step S3). That is, it is determined whether the reception signals of a predetermined number (for example, two or less) of transmission and reception columns Ch at both end portions arranged in the Y direction are abnormal.

When it is determined as Yes in step S3, there is a high possibility that one end side of the ultrasonic probe 10 overlaps the uneven portion of the living body. For example, when the abdomen is measured using the ultrasonic probe 10, the ultrasonic probe 10 is attached to the abdomen, but a part of the end portion may overlap a position of the navel. Here, when an abnormal reception signal is output from the transmission and reception column Ch on a +Y side, the determination unit 314B determines that an end portion of the ultrasonic probe 10 on the +Y side overlaps the uneven portion, and determines a direction in which the ultrasonic probe 10 is to be moved as a −Y side. When the abnormal reception signal is output from the transmission and reception column Ch on the −Y side, the determination unit 314B determines that an end portion of the ultrasonic probe 10 on the −Y side overlaps the uneven portion, and determines the direction in which the ultrasonic probe 10 is to be moved as the +Y side.

In this case, the notification unit 314C notifies the user that the ultrasonic probe 10 needs to be moved since the end portion of the ultrasonic probe 10 overlaps the uneven portion, and notifies the user of the direction of the ultrasonic probe 10 to be moved (side on which the normal reception signal is obtained) (step S4).

A method for notifying the user by the notification unit 314C is not particularly limited. For example, as described above, the ultrasonic probe 10 may be provided with the sound output unit such as the speaker, and in this case, the movement direction of the ultrasonic probe 10 may be given a notification of by a sound from the sound output unit. In addition, a lamp implemented by an LED or the like may be provided at the end portions on the ±Y side on a surface opposite from the opening window 41 of the housing 40, and the movement direction of the ultrasonic probe 10 may be given a notification of by turning on the lamp.

The notification unit 314C may transmit, to the terminal device 50, the information for prompting the movement of the ultrasonic probe 10 and the movement direction. In this case, the terminal device 50 may notify the user of the movement of the ultrasonic probe 10 and the movement direction using, for example, the speaker or the display unit 52.

Thereafter, the process returns to step S1. That is, after the attachment position of the ultrasonic probe 10 is changed by the user, the process of step S1 is performed when the user inputs the instruction to start the ultrasonic measurement again.

When it is determined as No in step S3, it means that the position of the transmission and reception column Ch that outputs the abnormal reception signal is not at the end portions. In this case, the determination unit 314B determines whether the number of transmission and reception columns Ch that output abnormal reception signals is equal to or greater than a preset reattachment determination value (for example, 1) (step S5).

When it is determined as No in step S5, there is a high possibility that air bubbles are interposed between the ultrasonic probe 10 and the living body. Accordingly, in this case, the notification unit 314C gives a notification of guidance to reapply the gel between the ultrasonic probe 10 and the living body (step S6).

Thereafter, the process returns to step S1.

Further, when it is determined as Yes in step S5, there is a high possibility that the ultrasonic probe 10 and the living body are not correctly attached and a contact abnormality occurs. Accordingly, the notification unit 314C gives a notification of guidance to reattach the ultrasonic probe 10 (step S7).

Thereafter, the process returns to step S1.

On the other hand, when it is determined as Yes in step S2, that is, when all the reception signals output from the transmission and reception columns Ch are normal, the position of the ultrasonic device 20 is normal.

In this case, the result output unit 314D outputs the obtained measurement result to the terminal device 50 (step S8). The measurement result output by the result output unit 314D to the terminal device 50 is, for example, the positions of the transmission and reception columns Ch and the reception signals output from the transmission and reception columns Ch. Accordingly, the terminal device 50 can generate an internal tomographic image of a measurement target based on the obtained measurement result, display the internal tomographic image on the display unit 52, and calculate a thickness of predetermined tissue.

Function and Effects of Embodiment

The ultrasonic system 1 according to the embodiment includes the ultrasonic probe 10 which is the ultrasonic apparatus, and the ultrasonic probe 10 includes the ultrasonic substrate 21, which is the ultrasonic transmission and reception unit, and the control substrate 30. The ultrasonic substrate 21 includes the ultrasonic array Ar1 in which the plurality of transmission and reception columns Ch (ultrasonic elements) each including the ultrasonic transducers Tr are arranged in the array, and can perform the ultrasonic transmission and reception process in each transmission and reception column Ch. In the control substrate 30, the control unit 31 including the processor 314 is implemented by one or a plurality of IC chips or the like, and the processor 314 of the control unit 31 reads and executes the program stored in the storage unit 313 to function as the determination unit 314B and the notification unit 314C. The determination unit 314B determines whether the position of the ultrasonic device 20 with respect to the living body as the object is appropriate based on the reception signals output when the plurality of transmission and reception columns Ch receive the ultrasonic waves. When the determination unit 314B determines that the position of the ultrasonic device 20 with respect to the living body is inappropriate, the notification unit 314C notifies the user of the position change of the ultrasonic device 20 (the ultrasonic probe 10).

As a result, the user can move the ultrasonic probe 10 to an appropriate position without, for example, checking the internal tomographic image obtained from the ultrasonic measurement result or any specialized knowledge.

In the embodiment, the determination unit 314B determines whether the reception signals output from the plurality of transmission and reception columns Ch are appropriate. When the reception signals are appropriate, it is determined that the ultrasonic elements that output the reception signals are arranged at a position appropriate for the object.

That is, in the embodiment, by determining whether a normal reception signal is obtained for each of the transmission and reception columns Ch, for example, it is possible to specifically determine which portion of the ultrasonic probe 10 is inappropriate in position. Accordingly, when it is determined that the position of the ultrasonic probe 10 is inappropriate, it is possible to determine in which direction the ultrasonic probe 10 is to be moved.

In the embodiment, the determination unit 314B determines that the reception signals are appropriate when signal peak values of the reception signals are within the predetermined allowable range and the attenuation time, which is time after the signal peak value is detected until the signal value is equal to or less than the predetermined first threshold, is equal to or less than the predetermined first time.

When the multiple reflection occurs due to air bubbles between the ultrasonic probe 10 and the living body, or when ultrasonic waves that are multiply reflected by a plurality of locations are received by the transmission and reception columns Ch due to the ultrasonic probe 10 being attached to the uneven portion, the signal value of the reception signal is over range, or tailing of the reception signal occurs, and thus a correct signal peak of the reception signal cannot be detected, and a measurement error occurs. In contrast, in the embodiment, a normal reception signal can be appropriately determined by determining a reception signal exceeding such an allowable range or a reception signal with a long tailing as the abnormal reception signal.

In the embodiment, the notification unit 314C gives a notification of the direction in which the ultrasonic probe 10 is to be moved based on the determination result for each transmission and reception column Ch obtained by the determination unit 314B.

Accordingly, when it is determined that the attachment position of the ultrasonic probe 10 is inappropriate, the user can easily know in which direction the ultrasonic probe 10 is to be moved, and convenience can be improved.

Second Embodiment

Next, a second embodiment will be described.

The first embodiment described above shows the example in which the main measurement process of step S8 is performed when all the transmission and reception columns Ch among the plurality of transmission and reception columns Ch (ultrasonic elements) output the normal reception signals. In contrast, the second embodiment is different from the first embodiment in that the measurement is continued when a predetermined number or more of the transmission and reception columns Ch among the plurality of transmission and reception columns Ch output the normal reception signals, that is, even when the number of abnormal reception signals is small.

Figure 10:
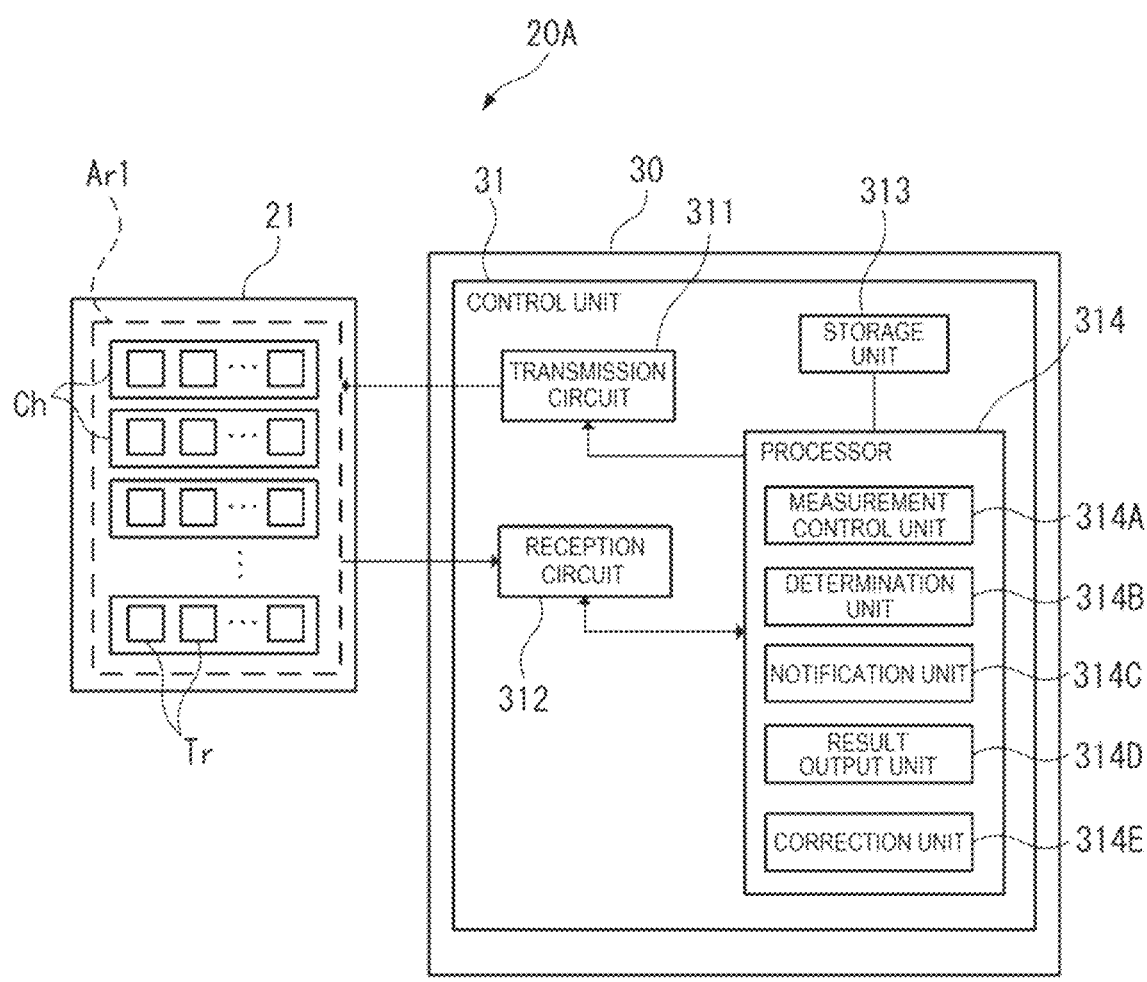
FIG. 10 is a block diagram of an ultrasonic device according to a second embodiment.

FIG. 10 is a block diagram showing a configuration of an ultrasonic device 20A according to the second embodiment.

In the embodiment, as in the first embodiment, the control unit 31 includes the transmission circuit 311, the reception circuit 312, the storage unit 313, and the processor 314. In the embodiment, the processor 314 functions as the measurement control unit 314A, the determination unit 314B, the notification unit 314C, and the result output unit 314D, and also functions as a correction unit 314E.

The correction unit 314E corrects an inappropriate reception signal of the transmission and reception column Ch that outputs the corresponding reception signal based on the reception signals of the other transmission and reception columns Ch. That is, in the embodiment, the determination unit 314B determines that the position of the ultrasonic probe 10 is appropriate when a predetermined allowable number or more of the reception signals among the reception signals output from the plurality of transmission and reception columns Ch are determined to be normal. However, in this case, the transmission and reception column Ch that outputs the abnormal reception signal may be included. In the embodiment, the correction unit 314E corrects such an abnormal reception signal based on the normal reception signals output from the other transmission and reception columns Ch.

Next, operations of the ultrasonic system 1 according to the second embodiment will be described.

Figure 11:
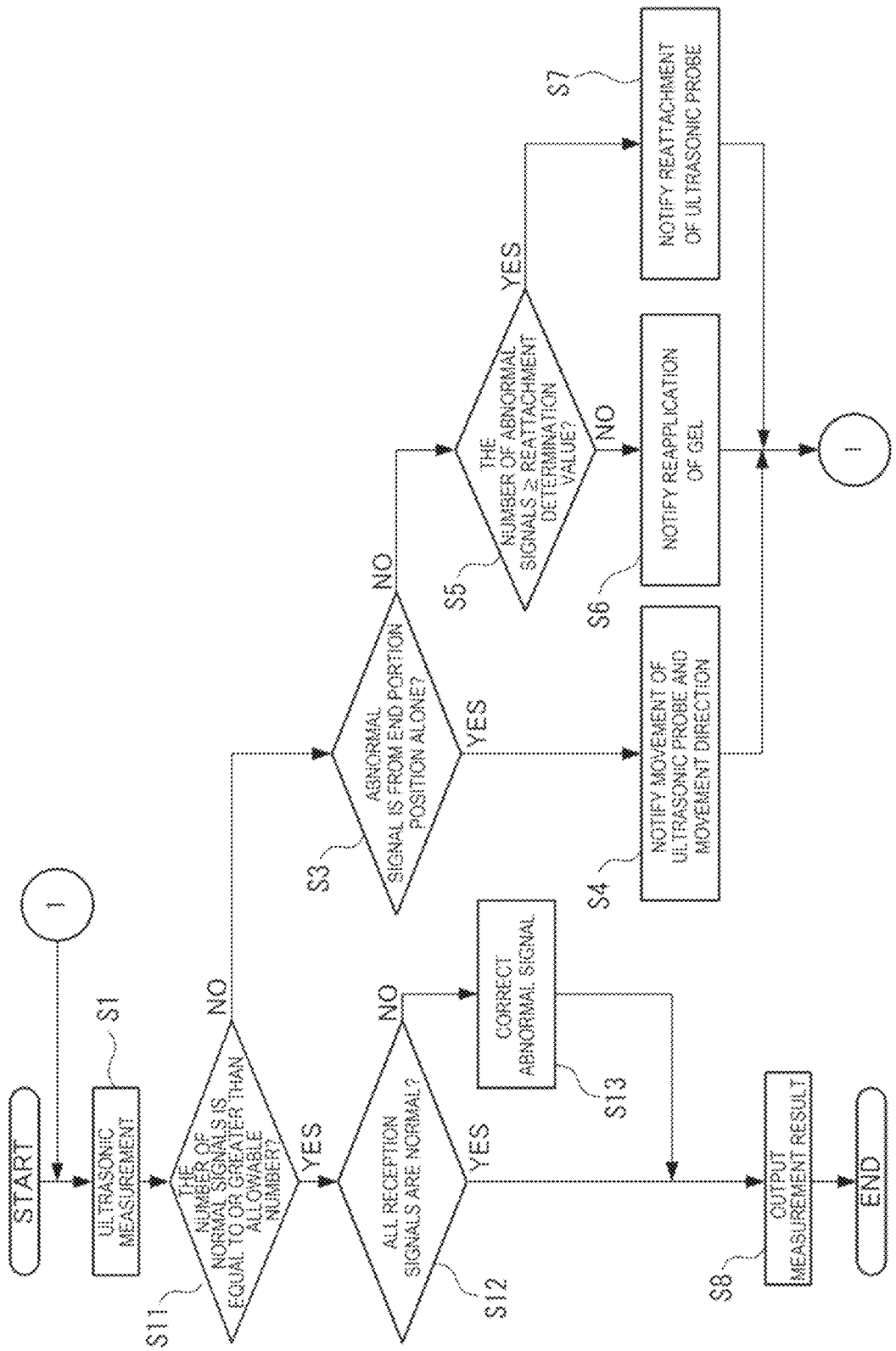
FIG. 11 is a flowchart showing an ultrasonic measurement method in the second embodiment.

FIG. 11 is a flowchart showing an ultrasonic measurement method in the embodiment.

As in the first embodiment, the user attaches the ultrasonic probe 10 to the living body and inputs the instruction to start the ultrasonic measurement. Accordingly, the measurement control unit 314A performs the ultrasonic measurement in step S1.

Next, as in the first embodiment, the determination unit 314B determines whether a position of the ultrasonic device 20A is appropriate based on the reception signals of the transmission and reception columns Ch. At this time, in the embodiment, first, the determination unit 314B determines whether a predetermined allowable number or more of the reception signals among the plurality of reception signals are normal (step S11).

When it is determined as No in step S11, that is, when the number of normal reception signals is less than the allowable number, as in the first embodiment, steps S3 to S7 are performed to give a notification of the movement of the attachment position of the ultrasonic probe 10, the reapplication of the gel, the reattachment of the ultrasonic probe, and the like.

On the other hand, when it is determined as Yes in step S11, it is determined whether all the reception signals are normal (step S12).

When it is determined as Yes in step S12, the process of step S8 similar to the first embodiment is performed, and the result output unit 314D outputs the obtained measurement result to the terminal device 50.

On the other hand, when it is determined as No in step S12, that is, when the allowable number or more of the normal reception signals are obtained but a slight number of abnormal reception signals are included, the correction unit 314E corrects signal values of the abnormal reception signals with the signal values of the normal reception signals (step S13).

FIG. 12 is a diagram showing an example of corrections of signal values performed by the correction unit 314E. In the example of FIG. 12, the number of channels (the number of transmission and reception columns Ch) is four including CH1 to CH4, and the allowable number is three.

In a pattern P1, since all the reception signals are normal, it is determined as Yes in step S12, and step S8 is performed.

In a pattern P4, since the number of normal reception signals is less than the allowable number, it is determined as No in step S11, and the movement of the attachment position of the ultrasonic probe 10, the reapplication of the gel, the reattachment of the ultrasonic probe, and the like are given a notification of.

In patterns P2 and P3, it is determined as No in step S12, and a correction process in step S13 is performed.

For example, when the transmission and reception column Ch that outputs an abnormal reception signal is at other than the end portion, the correction unit 314E obtains an average of signal values of a pair of transmission and reception columns Ch that sandwich the transmission and reception column Ch. For example, when the reception signal of the channel CH2 is abnormal as in the pattern P2, the reception signal of the channel CH2 is corrected to an average of the reception signals of the channels CH1 and CH3.

Further, as in the pattern P3, when the transmission and reception column Ch that outputs the abnormal reception signal is at the end portion (channel CH1), the correction unit 314E performs the correction with an average of the signal values of the reception signals of the other transmission and reception columns Ch (channels CH2, CH3, and CH4).

Here, in the case of the pattern P2, the abnormal reception signal is corrected by the reception signals of the pair of transmission and reception columns that sandwich the transmission and reception column that outputs the abnormal reception signal, and as in the pattern P3 to be described later, the abnormal reception signal may be corrected by all the normal reception signals.

Thereafter, step S8 is performed.

Function and Effects of Embodiment

In the embodiment, the determination unit 314B further determines whether the number of reception signals determined to be normal is equal to or greater than the predetermined allowable number, and the notification unit 314C gives a notification of the position change of the ultrasonic probe 10 when the number of reception signals determined to be normal by the determination unit 314B is less than the allowable number.

In the embodiment, even when there is a small number of abnormal reception signals, the measurement process performed by the ultrasonic probe 10 is continued when the allowable number or more of the normal reception signals are obtained. Accordingly, it is not necessary to repeatedly move or attach the ultrasonic probe 10, and the convenience for the user can be improved.

In the embodiment, the correction unit 314E is provided to correct the reception signal determined to be abnormal based on the reception signal determined to be normal when the number of reception signals determined to be normal by the determination unit 314B is equal to or greater than the allowable number.

In the embodiment, as described above, when the number of reception signals determined to be abnormal is small and the allowable number or more of the normal reception signals are obtained, the measurement is continued, and various processes such as the display of the internal tomographic image of the living body and the measurement of the thickness of a predetermined tissue such as muscle can be performed. At this time, when the abnormal reception signal is used as it is, the measurement error occurs, and when the measurement is continued without using the abnormal reception signal, measurement accuracy decreases. In contrast, in the embodiment, the correction unit 314E corrects the signal value of the abnormal reception signal based on the normal reception signal. Accordingly, it is possible to prevent the occurrence of the measurement error and the decrease in measurement accuracy.

Third Embodiment

In the first and second embodiments, in the ultrasonic probe 10, it is determined whether the attachment position of the ultrasonic probe 10 is appropriate by using the processing ultrasonic array Ar1 that acquires the internal tomographic image of the object and performs treatment on the predetermined tissue.

On the other hand, a third embodiment is different from the above embodiments in that a position detecting ultrasonic array Ar2 (see FIG. 13) for detecting whether the position of the ultrasonic probe is appropriate is provided separately from the processing ultrasonic array Ar1.

Figure 13:
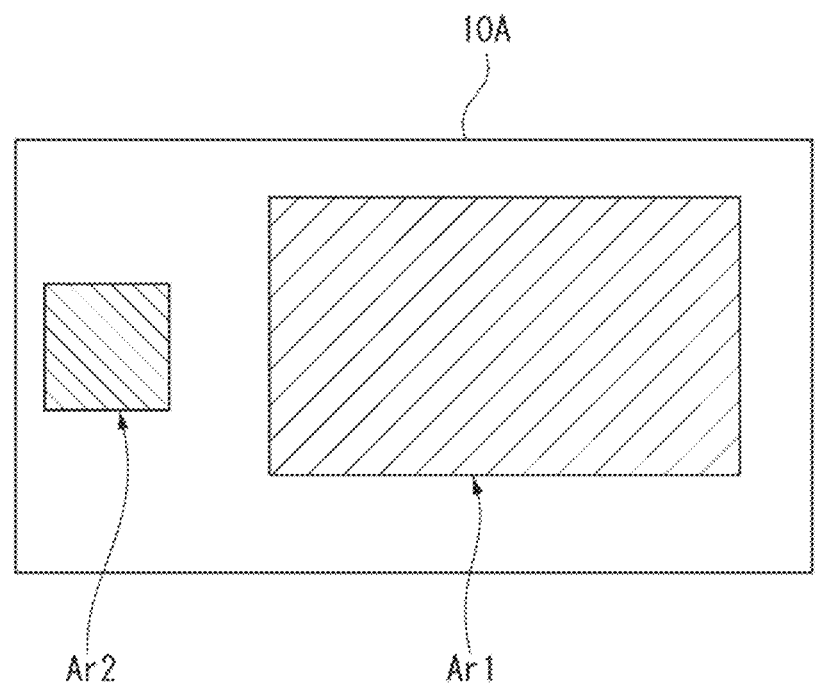
FIG. 13 is a diagram showing an example of a surface to be attached to an object of the ultrasonic probe according to a third embodiment.

FIG. 13 is a diagram showing an example of a surface to be attached to the object of an ultrasonic probe 10A according to the third embodiment.

In the embodiment, as shown in FIG. 13, the ultrasonic probe 10A is provided with the processing ultrasonic array Ar1 and the position detecting ultrasonic array Ar2. The ultrasonic arrays Ar1 and Ar2 may be provided at different positions on the same ultrasonic substrate 21, or may be separated from each other on the different ultrasonic substrates 21.

The processing ultrasonic array Ar1 is the same as the ultrasonic array Ar1 in the first embodiment, in which, for example, the ultrasonic transducers Tr arranged along the Y direction constitute each of the transmission and reception column Ch, and a plurality of independently drivable transmission and reception columns Ch are arranged along the X direction.

On the other hand, the position detecting ultrasonic array Ar2 includes the ultrasonic transducers Tr arranged in a two-dimensional array structure along the X direction and the Y direction, and the respective ultrasonic transducers Tr can be individually driven.

The ultrasonic probe 10A according to the embodiment is a probe to be attached to the abdomen, and for example, forms an internal tomographic image of the abdomen and measures the thickness of the predetermined tissue using the processing ultrasonic array Ar1.

At this time, in the embodiment, a relative position of the processing ultrasonic array Ar1 with respect to the position detecting ultrasonic array Ar2 is determined in advance such that the processing ultrasonic array Ar1 faces a measurement site by attaching the position detecting ultrasonic array Ar2 of the ultrasonic probe 10A to be located at the navel of the abdomen.

Figure 14:
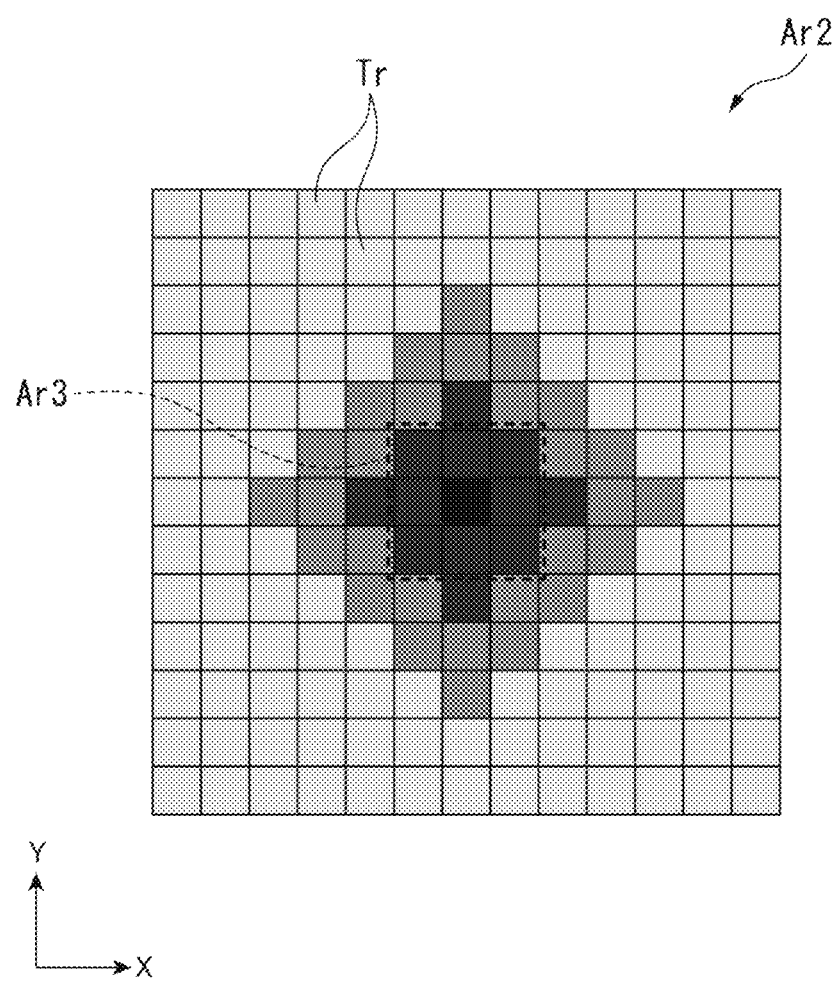
FIG. 14 is a diagram showing an arrangement example of ultrasonic transducers constituting a position detecting ultrasonic array and an example of signal values when ultrasonic waves are transmitted and received by the ultrasonic transducers in the third embodiment.

FIG. 14 shows an arrangement example of the ultrasonic transducers Tr constituting the position detecting ultrasonic array Ar2 and an example of signal values when ultrasonic waves are transmitted and received by the ultrasonic transducers Tr. The example of FIG. 14 is an example of the signal values in a state in which a center of the position detecting ultrasonic array Ar2 faces the navel of the abdomen.

In FIG. 14, grids arranged along the X direction and the Y direction indicate the individual ultrasonic transducers Tr. In each ultrasonic transducer Tr, shading of color indicates a magnitude of the signal value of the reception signal to be output or an integrated value of the signal values in a predetermined period. The deep color ultrasonic transducer Tr indicates that the signal value to be output or the integrated value of the signal values is large.

The navel of the abdomen has a larger uneven portion as compared with other skin areas, and accordingly, when the ultrasonic waves are transmitted from the position detecting ultrasonic array Ar2, the multiple reflection occurs at various positions. Accordingly, the number of multiple reflection components is the largest in a center portion of the navel, and sound pressure of the received ultrasonic waves is increased accordingly, and thus the signal value of the reception signal is increased. In addition, since a large number of multi-reflected ultrasonic waves are input to the ultrasonic transducer Tr at different timings, a vibration attenuation of the vibration portion 212A is slow, and the reception signal having a large amplitude (exceeding the first threshold) continues for a longer time (tailing becomes longer) than usual. As a result, the integrated value of the signal values of the reception signals in the predetermined period also increases accordingly.

Accordingly, the position of the ultrasonic probe 10A can be adjusted by performing alignment adjustment, so that the signal value (or the integrated value) of the center portion of the position detecting ultrasonic array Ar2 having the two-dimensional array structure as shown in FIG. 14 is large.

For example, in the example shown in FIG. 14, when the ultrasonic transducer Tr in a normal position range Ar3 has a maximum signal value (or a maximum integrated value), the determination unit 314B determines that the ultrasonic probe 10A is at the appropriate position.

On the other hand, when the ultrasonic transducer Tr that outputs the reception signal having the maximum signal value (or the maximum integrated value) is at a position different from the normal position range Ar3, the determination unit 314B determines that the position of the ultrasonic transducer Tr is inappropriate, and the notification unit 314C gives a notification of the movement direction of the ultrasonic probe 10A, so that the reception signal of the ultrasonic transducer Tr in the normal position range Ar3 has the maximum signal value (or the maximum integrated value).

Figure 15:
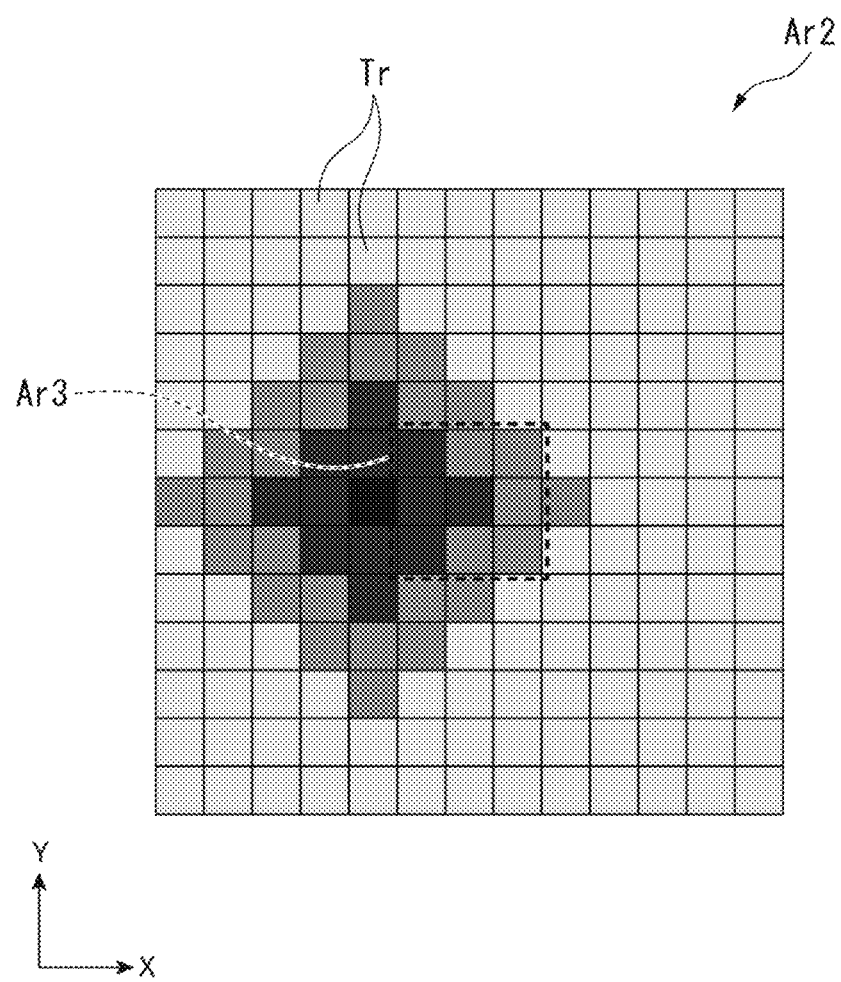
FIG. 15 is a diagram showing an example of the signal values of the ultrasonic transducers when a position of the ultrasonic probe is shifted in the third embodiment.

FIG. 15 shows an example of the signal values of the ultrasonic transducers Tr in the normal position range Ar3 when the position of the ultrasonic probe 10A is shifted.

For example, in the case of FIG. 15, the ultrasonic transducer Tr that outputs the maximum signal value (or the maximum integrated value) is located on the −X side by two grids from the center of the normal position range Ar3. When a size of one grid is, for example, 0.5 cm, the notification unit 314C notifies the user to move the ultrasonic probe to the −X side by two grids (1.0 cm).

Also in the embodiment, similarly to the first embodiment, the user can move the ultrasonic probe 10 to the appropriate position without, for example, checking the internal tomographic image obtained from the ultrasonic measurement result or any specialized knowledge.

Modifications

The present disclosure is not limited to the embodiments described above and modifications, and configurations obtained through modifications, alterations, and appropriate combinations of the embodiments within a scope of being capable of achieving the object of the present disclosure are included in the present disclosure.

The first embodiment to the third embodiment show the example in which since the position of the ultrasonic device 20 is fixed to the housing 40 of the ultrasonic probe 10, the notification unit 314C gives the notification of prompting the user to move the ultrasonic probe 10.

On the other hand, as long as the ultrasonic probe 10 has a configuration in which the ultrasonic device 20 can be relatively moved within a predetermined range with respect to the housing 40 attached to the living body, the user may be notified to move the ultrasonic device 20.

In the first embodiment and the second embodiment, the transmission and reception columns Ch are exemplified as the ultrasonic elements of the present disclosure. On the other hand, the ultrasonic transducers Tr may be individually driven as in the ultrasonic transducers Tr arranged in the position detecting ultrasonic array Ar2 according to the third embodiment. In this case, the ultrasonic transducers Tr constitute the ultrasonic elements of the present disclosure. Such ultrasonic transducers Tr may be arranged in the two-dimensional array structure or a one-dimensional array structure.

In the above embodiments, the example in which the ultrasonic probe 10 is attached to the living body is described, but the ultrasonic probe 10 may be attached to another object. Examples of the object to which the ultrasonic probe 10 is attached include inorganic materials such as a concrete structure.

Further, in the first embodiment to the third embodiment, the ultrasonic probe 10 corresponds to the ultrasonic apparatus of the present disclosure, and the ultrasonic system 1 may be the ultrasonic apparatus of the present disclosure. That is, in the first embodiment to the third embodiment, the control unit 31 is mounted on the control substrate 30 provided in the ultrasonic probe 10, and the processor 314 constituting the control unit 31 functions as the determination unit 314B, the notification unit 314C, and the correction unit 314E of the present disclosure. In contrast, the reception signals output from the transmission and reception columns Ch of the ultrasonic probe 10 may be transmitted to the terminal device 50 as it is, and the terminal device 50 may function as the determination unit 314B, the notification unit 314C, and the correction unit 314E of the present disclosure. That is, the terminal device 50 is a general computer including a storage unit and a processor, and the processor can function as the determination unit 314B, the notification unit 314C, and the correction unit 314E by reading and executing a program recorded in the storage unit.

Summary of Present Disclosure

An ultrasonic apparatus according to a first aspect of the present disclosure includes: an ultrasonic transmission and reception unit including a plurality of ultrasonic elements configured to transmit ultrasonic waves, receive the ultrasonic waves reflected inside an object and output a reception signal, the plurality of ultrasonic elements arranged in an array; a determination unit configured to determine whether a position of the ultrasonic transmission and reception unit with respect to the object is appropriate based on the reception signal output from each of the ultrasonic elements when the plurality of ultrasonic elements receive the ultrasonic waves; and a notification unit configured to notify a user of a position change of the ultrasonic transmission and reception unit when the determination unit determines that the position of the ultrasonic transmission and reception unit with respect to the object is inappropriate.

As a result, the user can move the ultrasonic transmission and reception unit to an appropriate position without, for example, checking the internal tomographic image obtained from the ultrasonic measurement result or any specialized knowledge. That is, the alignment adjustment of the ultrasonic device can be easily performed on an appropriate position of the object.

In the ultrasonic apparatus of the aspect, the determination unit may determine whether the reception signal output from each of the ultrasonic elements is normal, and determine whether the position of the ultrasonic element corresponding to the reception signal with respect to the object is appropriate.

In the aspect, since whether a normal reception signal is obtained for each of the ultrasonic elements is determined, it is possible to determine, for example, which portion of the ultrasonic transmission and reception unit is inappropriate in position with respect to the object. Accordingly, when it is determined that the position of the ultrasonic transmission and reception unit is inappropriate, it is possible to determine in which direction the ultrasonic transmission and reception unit is to be moved.

In the ultrasonic apparatus of the aspect, the determination unit may determine that the reception signal is normal when an attenuation time is equal to or less than a predetermined first time, the attenuation time being time after a peak of a signal value of the reception signal is detected until the signal value is equal to or less than a predetermined first threshold.

When the multiple reflection occurs due to air bubbles between the ultrasonic transmission and reception unit and the object, or when ultrasonic waves that are multi-reflected by a plurality of locations are received by the transmission and reception columns Ch due to the ultrasonic probe 10 being attached to the uneven portion, the signal value of the reception signal exceeds the allowable range to cause an over-range, or the attenuation time of the reception signal is long (so-called tailing), and thus it is not possible to perform the appropriate measurement. On the other hand, in the aspect, it is determined that the reception signal in which the reception signal is within the allowable range and the attenuation time is equal to or less than the first time is normal, and thus it is possible to appropriately determine a case in which there is an air bubble between the ultrasonic transmission and reception unit and the object and a case in which the attachment position is uneven.

In the ultrasonic apparatus of the aspect, the notification unit may give a notification of a direction in which the ultrasonic transmission and reception unit is to be moved based on a determination result of the ultrasonic elements obtained by the determination unit.

Accordingly, the user can easily know in which direction the ultrasonic transmission and reception unit is to be moved, and the convenience can be improved.

In the ultrasonic apparatus of the aspect, the determination unit may further determine whether the number of the reception signal determined to be normal is equal to or greater than a predetermined allowable number, and the notification unit may give a notification of the position change of the ultrasonic transmission and reception unit with respect to the object when the number of the reception signal determined to be normal by the determination unit is less than the allowable number.

In the aspect, when the number of the normal reception signal is less than the allowable number, the position change of the ultrasonic transmission and reception unit is given a notification of. Accordingly, when a slight number of the abnormal reception signals are output, the position change of the ultrasonic transmission and reception unit is not given a notification of. As a result, since the allowable number or more of the normal reception signals may be obtained, the user is not excessively prompted to change the position of the ultrasonic transmission and reception unit, and the convenience can be improved.

The ultrasonic apparatus of the aspect may further include a correction unit configured to correct the reception signal determined to be abnormal based on the reception signal determined to be normal when the number of the reception signal determined to be normal by the determination unit is equal to or greater than the allowable number.

In the above aspect, when the number of the reception signal determined to be abnormal is small, and the allowable number or more of the normal reception signals are obtained, the measurement is continued, but when the abnormal reception signal is used as it is, the measurement error occurs, and when the measurement is continued without using the abnormal reception signal, measurement accuracy decreases. In contrast, in the aspect, the correction unit corrects the signal value of the abnormal reception signal based on the normal reception signal, and thus, it is possible to prevent the occurrence of the measurement error and the decrease in measurement accuracy.

What is claimed is:

1. An ultrasonic apparatus comprising:
an ultrasonic transmission and reception assembly including a plurality of ultrasonic elements, each of the plurality of ultrasonic elements being configured to transmit an ultrasonic wave, receive the ultrasonic wave reflected inside an object, and output a reception signal, the plurality of ultrasonic elements being arranged in an array, the ultrasonic transmission and reception assembly being attachable to a surface of the object, wherein a treatment material is adapted to be selectively applied between the ultrasonic transmission and reception assembly and the surface of the object;
a memory configured to store a program;
and a processor configured to execute the program so as to:
 detect whether a peak of the reception signal of each of the plurality of ultrasonic elements is within a predetermined range;
 determine whether an attenuation time of the reception signal of each of the plurality of ultrasonic elements from the peak is equal to or less than a first period of time, the first period of time being more than 0 msec, the attenuation time being defined from a time in which the peak is detected to a time in which a value of the reception signal of each of the plurality of ultrasonic elements is equal to or less than a first threshold value;
 determine a first state in which a position of the ultrasonic transmission and reception assembly relative to the object is appropriate when:
  the peak of each of the plurality of ultrasonic elements is within the predetermined range;
  and the attenuation time of each of the plurality of ultrasonic elements is equal to or less than the first period of time;
 determine a second state in which a position of the ultrasonic transmission and reception assembly relative to the object is inappropriate when:
  the peak of a first ultrasonic element of the plurality of ultrasonic elements is outside the predetermined range, the first ultrasonic element is located at an edge of the array of the plurality of ultrasonic elements; or
  the attenuation time of the first ultrasonic element is more than the first period of time;

determine a third state in which the position of the ultrasonic transmission and reception assembly relative to the object is inappropriate when:
   the peak of each of a first group of ultrasonic elements of the plurality of ultrasonic elements is outside the predetermined range, the first group of ultrasonic elements is located away from the edge of the array of the plurality of ultrasonic elements; or
   the attenuation time of each of the first group of ultrasonic elements is more than the first period of time;
perform a measurement with respect to the object when:
   the position of the ultrasonic transmission and reception assembly relative to the object is in the first state;
notify a user of a position change of the ultrasonic transmission and reception assembly when:
   the position of the ultrasonic transmission and reception assembly relative to the object is in the second state;
notify the user to re-apply the treatment material on the surface of the object when:
   the position of the ultrasonic transmission and reception assembly relative to the object is in the third state and a number of ultrasonic elements of the first group of ultrasonic elements determined in the third state is equal to or less than a first value; and
notify the user to detach the ultrasonic transmission and reception assembly from the object and re-attach the ultrasonic transmission and reception assembly to the surface of the object when:
   the position of the ultrasonic transmission and reception assembly relative to the object is in the third state and the number of ultrasonic elements of the first group of ultrasonic elements determined in the third state is more than the first value.

2. The ultrasonic apparatus according to claim 1 wherein the processor is further configured to notify the user a direction toward which the position change of the ultrasonic transmission and reception assembly is required.

* * * * *